Feb. 2, 1960

A. J. SCHAID ET AL 2,923,193

WORK LOCATING STOP

Filed March 22, 1957

INVENTORS
A. J. SCHAID
G. SVOBODA
BY R. P. Miller
ATTORNEY

United States Patent Office 2,923,193
Patented Feb. 2, 1960

2,923,193
WORK LOCATING STOP

Arthur J. Schaid, Chicago, and George Svoboda, Berwyn, Ill., assignors to Western Electric Company, Incorporated, New York, N.Y., a corporation of New York Application March 22, 1957, Serial No. 647,887

1 Claim. (Cl. 82—34)

This invention relates to screw machine attachments, and more particularly to a work locating stop for use in conjunction with screw machines, lathes and the like.

In fabricating long work pieces from bar stock, it is frequently necessary that machining operations be performed on both ends of the stock with the relatively large dimension between the machined portions being restricted by small dimensional tolerances. In the past, it has been a time consuming operation to locate the cutting tool of a screw machine relative to a remote, previously machined portion of the work piece with sufficient accuracy to maintain small tolerances. When manufacturing large quantities of work pieces of this nature, it is desirable that the time consumed by the locating operation be minimized.

It is therefore a principal object of this invention to provide an apparatus which will quickly and accurately locate previously machined portions of successive work pieces relative to the cutting tool of a screw machine.

It is another object of this invention to provide a work stop for a screw machine which is adjustable to accommodate work pieces of various lengths.

It is yet another object of this invention to provide a work stop for a screw machine which is adapted to be removed from contact with a work piece upon completion of the locating operation.

With these and other objects in view, the present invention contemplates a locating cap which is adapted to fit over a previously machine end of a work piece and a locating lever pivotally mounted on the bed of a screw machine adapted to engage and hold the cap in a fixed position relative to the bed of the screw machine. Means are provided for adjusting the position of the clamping lever relative to the cutting tool of the screw machine in order that the distance between the cutting tool and the end of the work piece may be preset.

Figure 1:
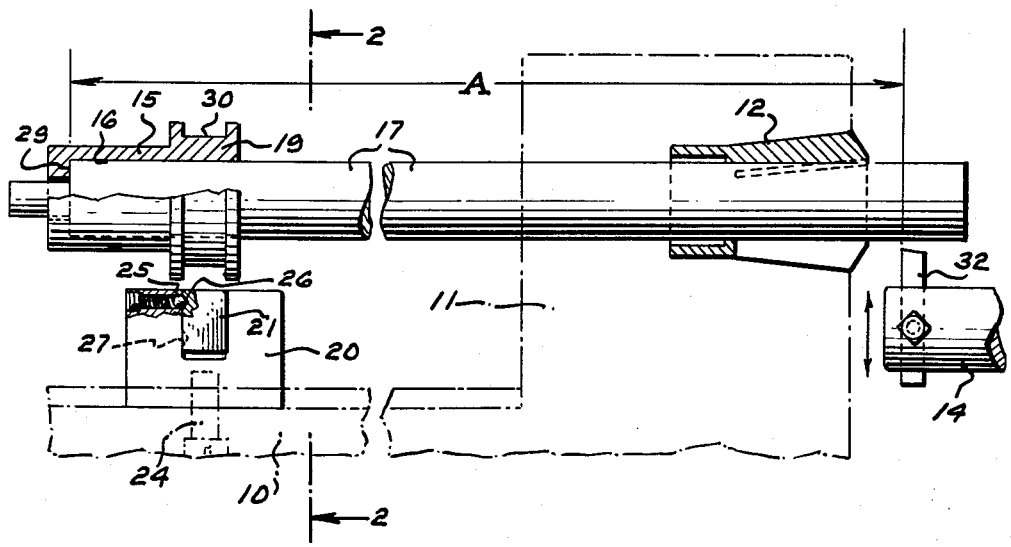
Figure 2:
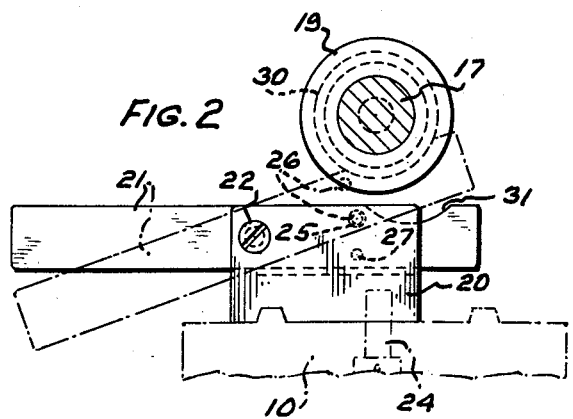

Other objects, advantages, and novel features of the invention will become apparent upon consideration of the following detailed description in conjunction with the accompanying drawings wherein:

Fig. 1 is a side elevation, partially in section, of an apparatus embodying the principal features of the invention, and Fig. 2 is a sectional view taken along the line 2—2 of Fig. 1.

Attention now is directed to the drawings wherein like numerals of reference designate like parts throughout the several views and wherein a screw machine is diagrammatically shown as comprising a bed 10, a chucking and driving head 11, a chuck 12 and a movably mounted tool holder 14. It is not deemed to be necessary to detail a specific screw machine because the invention is suitable for use with various types of screw machines that are well known to those skilled in the art.

A locating cap 15 is provided with a recess 16 of such diameter that the cap may receive a machined end of a work piece 17 as is best shown in Fig. 1. The locating cap 15 is further provided with a yoke 19 formed integral therewith.

A supporting block 20 is provided for supporting a locating lever 21 by means of a pivot pin 22 (Fig. 2). A clamping screw 24 is provided so that the block 20 may be clamped in a plurality of positions along the ways formed in the bed 10. A spring loaded ball 25 is positioned within an aperture in the block 20 for engagement with conical depressions 26 or 27 to lock the locating lever 21 in one of the two positions shown in Fig. 2.

Operation

In order that a better understanding of the invention may be had, the manner in which it is used will now be described. A work piece 17 is first inserted into the open chuck 12 with the previously machined end toward the left (Fig. 1). The locating cap 15 is then placed over the end of the work piece 17 so that a shoulder 29 on the work piece 17 engages the bottom of the recess 16. The work piece 17 and cap 15 are then moved manually until a groove 30 formed in the yoke 19 is approximately aligned with the locating lever 21. The lever 21 is then pivoted to the position indicated by phantom lines in Fig. 2 to move an arcuate indentation 31 formed in the lever 21 into contact with the bottom of the groove 30 in the yoke 19. The block 20 and lever 21, which are secured in a predetermined position, thus position the locating cap 15 relative to the tool holder 14. The lever 21 is of a width slightly smaller than the width of the groove 30 so that the locating cap 15 may be repeatedly located in the same position relative to the tool holder 14 and a cutting tool 32 therein. Thus the dimension A, the distance between the bottom of the recess 16 and the cutting tool 32, which is the dimension it is desired to control, may be repeatedly obtained by the simple expedient of engaging the lever 17 in the groove 30.

The work piece 17 is then pushed to the left (Fig. 1) to insure that the shoulder 29 is firmly seated against the bottom of the recess 16 and the chuck 12 is closed to grip the work piece. The lever 21 is then depressed to the position shown by solid lines in Fig. 2 and the cap 15 removed from the end of the work piece 17. The work is then ready for turning with the dimension between the machined portions (A) insured to a high degree of accuracy. Should it be desired to turn bar stock to make work pieces where the controlling dimension A is of different values, it is merely necessary to loosen the clamping screw 24 and relocate the block 20 along the ways of the machine at such points that the desired dimensions will be obtained.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

In a work piece positioning device, a hollow work receiving cup member, a double flanged hub formed on and encircling said cup member, a base member, a lever having an arcuate recess formed therein pivotally mounted on said base member with the arcuate recessed portion of said lever positioned between the flanges of said hub, and means for locking the lever in said flange of said hub, and means for locking the lever in said flange engaging position.

References Cited in the file of this patent
UNITED STATES PATENTS

| | | |
|---|---|---|
| 344,926 | Stevens | July 6, 1886 |
| 929,226 | Key | July 27, 1909 |
| 2,189,968 | Stone | Feb. 13, 1940 |
| 2,373,155 | White | Apr. 10, 1945 |
| 2,392,571 | Berger | Jan. 8, 1946 |
| 2,742,656 | Fischer | Apr. 24, 1956 |

UNITED STATES PATENT OFFICE

CERTIFICATE OF CORRECTION

Patent No. 2,923,193                        February 2, 1960

Arthur J. Schaid et al.

It is hereby certified that error appears in the printed specification of the above numbered patent requiring correction and that the said Letters Patent should read as corrected below.

Column 2, lines 60 and 61, strike out "and means for locking the lever in said flange of said hub,".

Signed and sealed this 2nd day of August 1960.

(SEAL)
Attest:

KARL H. AXLINE
Attesting Officer

ROBERT C. WATSON
Commissioner of Patents